E. J. FERRY.
MAGNETIC BRAKE.
APPLICATION FILED MAR. 11, 1918.

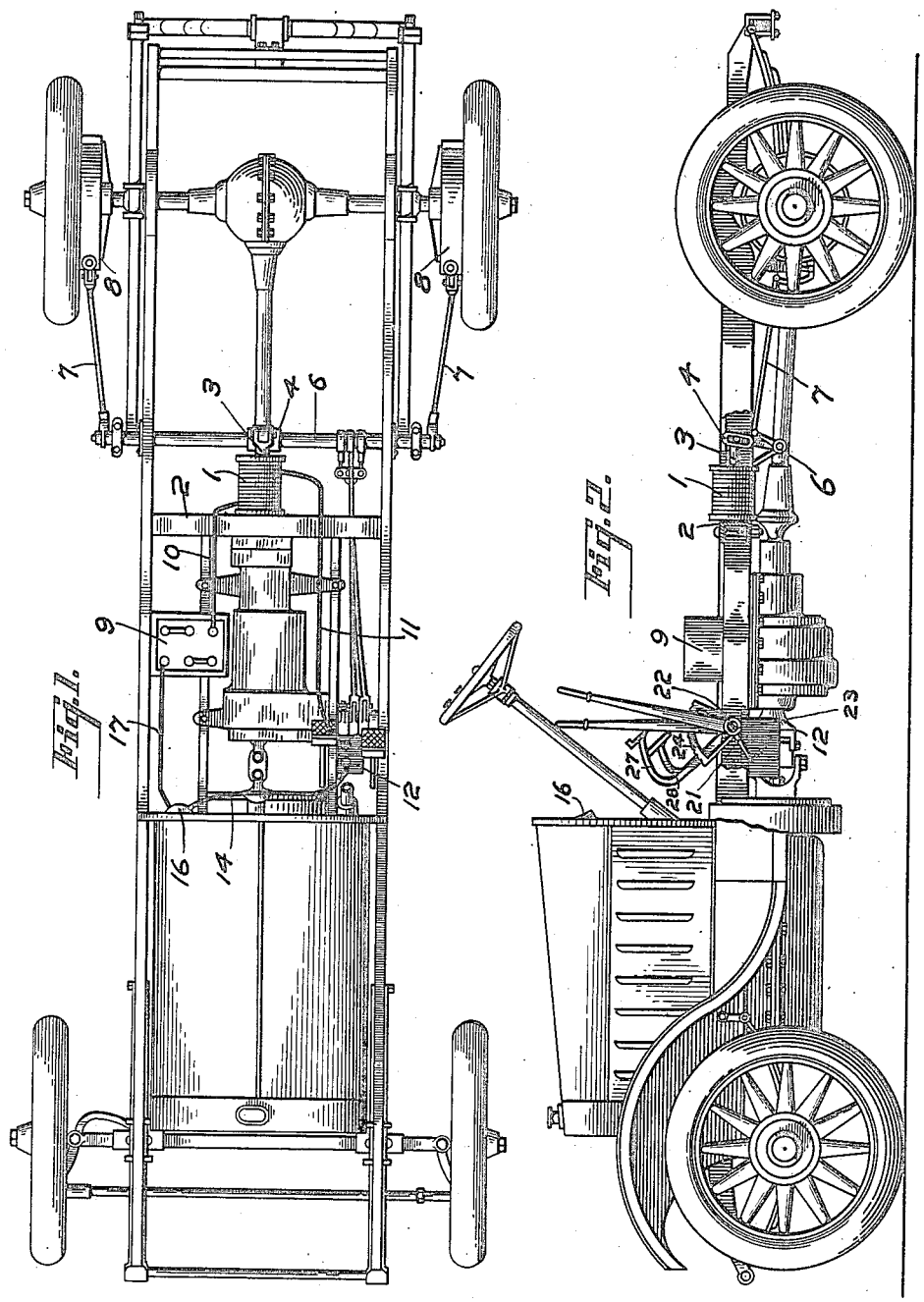

1,294,784.

Patented Feb. 18, 1919.
2 SHEETS—SHEET 2.

Inventor
Earl J. Ferry.
By Arthur L. Slee
Atty.

UNITED STATES PATENT OFFICE.

EARL J. FERRY, OF KING CITY, CALIFORNIA.

MAGNETIC BRAKE.

1,294,784.  Specification of Letters Patent.  Patented Feb. 18, 1919.

Application filed March 11, 1918. Serial No. 223,235.

*To all whom it may concern:*

Be it known that I, EARL J. FERRY, a citizen of the United States, residing at King City, in the county of Monterey and State of California, have invented certain new and useful Improvements in Magnetic Brakes, of which the following is a specification.

My invention relates to improvements in magnetic brakes for motor vehicles and the like wherein a solenoid operates in conjunction with a source of electrical energy and circuit controlling means to retard the progress of a motor vehicle; and the objects of my invention are—

First, to provide an improved magnetic brake for motor vehicles and the like;

Second, to provide an improved magnetic brake adapted to operate the braking mechanism of a motor vehicle when either the brake or clutch pedal, or the hand brake is operated to retard the progress of the vehicle;

Third, to normally retain the magnetic brake inoperative until a predetermined speed has been attained by the vehicle and to render the said brake operative to retard the progress of the vehicle until such progress shall have entirely ceased.

I accomplish these several objects by means of the device disclosed in the drawings forming a part of the present specification wherein like characters of reference are used to designate similar parts throughout the said specification and drawings and in which—

Figure 1 is a plan view of a motor vehicle chassis disclosing my invention applied thereto;

Fig. 2 is a partly broken side elevation of Fig. 1;

Fig. 3 is a side elevation on an enlarged scale disclosing the rheostat operatively connected to the pedals and hand brake;

Fig. 4 is a longitudinal sectional view taken on the line 4—4 of Fig. 3 of the drawings;

Fig. 5 is a broken plan view of the speedometer connection; and

Fig. 6 is a front elevation of Fig. 5 with the speedometer housing removed.

Referring to the drawings the numeral 1 is used to designate a solenoid secured to the frame or chassis 2. The movable core 3 of the solenoid 1 is operatively connected to an arm 4 upon a shaft 6 rotatably mounted upon the chassis 2 and having connections 7 to the hand brakes 8.

A suitable battery 9, or other suitable source of electrical energy, has a connection 10 to one end of the solenoid coil while the other end of said coil is connected by means of a connection 11 to a contact arm on a suitable rheostat 12 which may be secured to the chassis 2 adjacent the pedals and hand brake of the vehicle.

A connection 14 leads from the rheostat 12 to the speedometer indicated in general by the numeral 16, from whence a connection 17 leads back to the battery 9.

The contact arm 21 of the rheostat 12 is provided with a sleeve 22 which may be rotatably mounted upon the gear shift shaft 23 said sleeve 22 being provided with projections 24 which lie within the path of pins 26 upon the clutch, brake pedals and brake lever 27, 28 and 29 respectively.

By means of this arrangement the rheostat contact arm 21 is operated to cut out resistance units within the rheostat 12 when either the pedals 27 and 28 or the emergency hand brake 29 is operated thereby permitting a flow of full strength current to flow to the solenoid 1 when either of the above mentioned elements is operated to its limit, the purpose of which will hereinafter be more fully set forth.

The connections 14 and 17 from the rheostat 12 and battery 9 respectively, terminate in contacts 31 and 32 adjacent the speedometer 16 as indicated in Fig. 6 of the drawings.

These contacts 31 and 32 are arranged to be closed by means of a contact plate 33 secured to and insulated from a lever 34 pivotally mounted as at 36. The central portion adjacent the speedometer 16 is formed arcuate as at 35 so as to lie close to the speedometer 16.

The arcuate portion 35 is provided with a depending arcuate arm 37 having an extension 38 slidably mounted thereon and engaging a pin 39 within an adjusting arm 41 whereby the extension 38 may be moved to shorten or lengthen the depending arm 37.

A pin 42, having a beveled end, is mounted upon the speedometer 16 and when the said speedometer 16 is rotated by the increasing speed of the vehicle the pin 42 traverses an inclined surface 43 formed at the junction of the arm 37 and the lever 34 and thereby raises said lever 34 and removes the contact 33 from the terminals 31 and 32 thereby breaking the circuit so that no current can flow to the solenoid 1 until a predetermined speed is attained by the vehicle which speed is in proportion of the extended length of the arm 37 and extension 38 thereof. When the end of the extension 38 is traversed by the pin 42 the lever 34 is released and the plate 33 on the end thereof drops onto the terminals 31 and 32 and closes the circuit at that point, but as long as the clutch and brake pedals 27 and 28 respectively are in normal position the circuit is open between the rheostat 12 and the solenoid 1 so that the braking mechanism will not be operated.

By means of this arrangement a vehicle may be driven through congested traffic at a slow rate of speed and the magnetic brake will not be operated at each movement of the clutch pedal when it is desired to coast or temporarily disconnect the motor from the vehicle to only slightly arrest or retard progress or increased speed of said vehicle.

In operation the length of the extension 38 may be adjusted or set to be released by the pin 42 at any speed above 15 or 20 miles per hour. After such a speed has been attained should it be desired to suddenly retard the progress of the vehicle as in an emergency case, the operation of the clutch pedal 27, the foot brake pedal 28, or the emergency hand brake lever 29, such operation of either or all of these several elements will operate to cut out resistances within the rheostat 12 and cause full current to flow through the solenoid 1 and thereby effectively operate the braking mechanism.

It will be observed that as the speed of the vehicle is being constantly decreased the pin 42 of the speedometer will reverse its direction of movement and will travel toward the contacts 31 and 32 or anti-clockwise. As the pin 42 approaches the end of the extension 38 instead of engaging said extension which then lies below it, it will traverse the arcuate portion 35 of the lever 34 and move the said lever 34 slightly outward by means of the beveled end of the pin 42 thereby leaving the contact plate 33 continually across the terminals 31 and 32 so that a full current will continue to flow through the solenoid 1 until the progress of the vehicle shall have been entirely arrested.

While the vehicle is traveling at an extremely low rate of speed the contact plate 33 will close the circuit through the contacts or terminals 31 and 32 but the circuit will be broken at the rheostat 12 while the pedals and hand brake are in normal condition.

After the vehicle has attained a speed sufficient to cause the pin 42 to raise the lever 34 and break the circuit at the speedometer 16 the said vehicle may be driven slowly through congested traffic when it may be desired to temporarily throw out the clutch or slightly apply the foot brake which may be done without applying the magnetic brake as the said circuit is broken at the speedometer 16.

After the vehicle attains a speed sufficient to carry the pin 42 past the extension 38 the lever 34 will be released from the said pin 42 and the plate 33 will close contact between the terminals 31 and 32 thereby closing the circuit at that point so that when the clutch or foot brake is operated a pressure will be applied to the brakes through the magnetic brake in direct proportion to the distance the said pedals are moved to cut out certain resistances within the rheostat 12.

It is obvious from the foregoing that I have provided an improved magnetic brake for motor vehicles and the like wherein the operation of either clutch pedal, foot brake or emergency hand brake will operate said magnetic clutch. It is also evident that I have provided means for rendering the magnetic brake inoperative at certain slow speeds of the vehicle as well as means for adjusting the speed at which said brake will remain inoperative.

Having thus described my invention what I claim as new and desire to secure by Letters Patent is—

1. A magnetic brake for motor vehicles and the like comprising a solenoid operatively connected to the braking mechanism of the vehicle; a source of electrical energy connected to the solenoid; means operatively connected to the pedals and hand brake of the vehicle and normally disconnecting the source of electrical energy from the solenoid and arranged to close said source to the solenoid to operate the same and thereby apply the brakes when either pedal or the hand brake is operated.

2. A magnetic brake for motor vehicles and the like comprising a solenoid operatively connected to the braking mechanism of the vehicle; a source of electrical energy connected to the solenoid; means operatively connected to the pedals and hand brake of the vehicle and normally disconnecting the source of electrical energy from the solenoid and arranged to close said source to the solenoid to operate the same and thereby apply the brakes when either pedal or the hand brake is operated; and means for normally retaining an open circuit between the source of electrical energy and the solenoid until the vehicle attains a predetermined speed.

3. A magnetic brake for motor vehicles and the like comprising a solenoid operatively connected to the braking mechanism of the vehicle; a source of electrical energy connected to the solenoid; a rheostat connected to the source of electrical energy and to the solenoid; and means operatively connecting the rheostat to both pedals and to the hand brake of the vehicle to normally disconnect the energy from the solenoid and to connect said energy with said solenoid when either pedal or hand brake is operated.

4. A magnetic brake for motor vehicles and the like comprising a solenoid operatively connected to the braking mechanism of the vehicle; a source of electrical energy connected to the solenoid; a rheostat connected to the source of electrical energy and to the solenoid; and means operatively connecting the rheostat to both pedals and to the hand brake of the vehicle to normally disconnect the source of energy from the solenoid and to connect said source of energy with said solenoid when either pedal or hand brake is operated; and means operatively connected to the speedometer of the vehicle to normally retain the circuit between the source of electrical energy and the solenoid open until the vehicle attains a predetermined speed.

5. A magnetic brake for motor vehicles and the like comprising a solenoid operatively connected to the braking mechanism of the vehicle; a source of electrical energy connected to the solenoid; a rheostat connected to the source of electrical energy and to the solenoid; and means operatively connecting the rheostat to both pedals and to the hand brake of the vehicle to normally disconnect the source of energy from the solenoid and to connect said source of energy with said solenoid when either pedal or hand brake is operated; and means operatively connected to the speedometer of the vehicle to normally retain the circuit between the source of electrical energy and the solenoid open until the vehicle attains a predetermined speed and to normally retain said circuit closed while the speed of the vehicle is decreasing until said vehicle becomes stationary.

6. A magnetic brake for motor vehicles and the like comprising a solenoid operatively connected to the braking mechanism of the vehicle; a source of electrical energy connected to the solenoid; a rheostat connected to the source of electrical energy and to the solenoid; means operatively connected to both pedals and the hand brake of the vehicle to normally disconnect the source of energy from the solenoid and to connect said source of energy with the solenoid when either pedal or hand brake is operated; a lever actuated by the speedometer of the vehicle to open the circuit between the source of electrical energy and the solenoid until the vehicle attains a predetermined speed and to automatically close said circuit and to keep it closed while the speed of the vehicle is being decreased by the action of the magnetic brake until the progress of said vehicle is entirely arrested.

7. A magnetic brake for motor vehicles and the like comprising a solenoid operatively connected to the braking mechanism of the vehicle; a source of electrical energy connected to the solenoid; a rheostat connected to the source of electrical energy and to the solenoid; means operatively connected to both pedals and the hand brake of the vehicle to normally disconnect the source of energy from the solenoid and to connect said source of energy with the solenoid when either pedal or hand brake is operated; a lever actuated by the speedometer of the vehicle to open the circuit between the source of electrical energy and the solenoid until the vehicle attains a predetermined speed and to automatically close said circuit and to keep it closed while the speed of the vehicle is being decreased by the action of the magnetic brake until the progress of said vehicle is entirely arrested; and means for adjusting the speed at which the said lever operates to close the circuit.

In witness whereof I hereunto set my signature.

EARL J. FERRY.